United States Patent
Shimizu et al.

(10) Patent No.: US 8,640,571 B2
(45) Date of Patent: Feb. 4, 2014

(54) AUTOMATIC ROTATING-TYPE TURRET DEVICE FOR WORK MACHINERY

(75) Inventors: Tatsuo Shimizu, Nagaoka (JP); Takio Nakamura, Nagaoka (JP); Akihiro Goto, Nagaoka (JP); Yuki Noguchi, Nagaoka (JP)

(73) Assignee: O-M Ltd., Osaka (JP)

( * ) Notice: Subject to any disclaimer, the term of this patent is extended or adjusted under 35 U.S.C. 154(b) by 547 days.

(21) Appl. No.: 12/847,388

(22) Filed: Jul. 30, 2010

(65) Prior Publication Data

US 2011/0035917 A1  Feb. 17, 2011

(30) Foreign Application Priority Data

Aug. 17, 2009 (JP) ................................. 2009-188591

(51) Int. Cl.
*B23Q 16/10* (2006.01)
*B23Q 1/54* (2006.01)

(52) U.S. Cl.
CPC ................................. *B23Q 1/5431* (2013.01)
USPC ............. 74/813 R; 74/813 L; 29/35.5; 29/40; 82/120; 82/121; 408/35

(58) Field of Classification Search
USPC ........... 74/813 R–813 L; 29/35.5, 40; 82/120, 82/121; 408/35
IPC ........................................................ B23B 29/32
See application file for complete search history.

(56) References Cited

U.S. PATENT DOCUMENTS

| | | | | |
|---|---|---|---|---|
| 4,922,591 A | * | 5/1990 | Campbell | 483/1 |
| 6,925,694 B2 | * | 8/2005 | Sauter et al. | 29/40 |
| 7,117,773 B2 | * | 10/2006 | Katoh et al. | 82/121 |
| 7,150,085 B2 | * | 12/2006 | Ishiguro | 29/40 |
| 7,263,915 B2 | * | 9/2007 | Lu | 74/813 R |
| 7,275,460 B2 | * | 10/2007 | Gunter | 74/813 R |
| 7,761,965 B2 | * | 7/2010 | Nakamura et al. | 29/35.5 |
| 2006/0124719 A1 | * | 6/2006 | Mannlein | 229/403 |

FOREIGN PATENT DOCUMENTS

| | | | | |
|---|---|---|---|---|
| JP | 57-149903 U | | 9/1982 | |
| JP | 61-79505 | * | 4/1986 | B23B 29/32 |
| JP | 2002337011 A | * | 11/2002 | |
| JP | 2009-083070 Q | | 4/2009 | |
| WO | WO 97/02923 | * | 1/1997 | B23Q 16/10 |

OTHER PUBLICATIONS

JP2002-337011A—Machine Translation.*

* cited by examiner

*Primary Examiner* — Vinh Luong
(74) *Attorney, Agent, or Firm* — Sughrue Mion, PLLC

(57) ABSTRACT

An automatic rotating turret device for work machinery is provided, in which a lift turret is not used. The turret device is provided with an axial-direction slide body, which is advanced or retracted in the direction of the axis of rotation of the turret by the drive device advancing or retracting the drive body in a direction orthogonal to the direction of rotation axis; and a clutch device that is engaged or disengaged by the axial-direction slide body being advanced or retracted, the turret being of a non-lift-type, and there being provided to the drive body a tapering action part for generating an expanding action caused by the movement of the drive body and pressingly sliding the axial-direction slide body against the turret stage.

6 Claims, 10 Drawing Sheets

AUTOMATIC ROTATING-TYPE TURRET DEVICE FOR WORK MACHINERY

BACKGROUND OF THE INVENTION

1. Field of the Invention

The present invention relates to an automatic rotating-type turret device used for work machinery such as a vertical lathe.

2. Description of the Related Art

Automatic rotating-type turret devices, in which a plurality of tools are provided on a turret, wherein the tool in use is switched from one to another by rotation, and the turret is automatically caused to rotate relative to a turret stage when tools are being switched, generally have the following configuration (a description will be given with reference to drawings of the present embodiment and using keys that are identical to those of the equivalent sections in the present embodiment).

The automatic rotating-type turret device is configured so that a turret 3 having a plurality of tools (a plurality of blade tools 21 exchangeably provided to each of a plurality of holders 20) is rotatably fitted on a rotation shaft portion 2 protrudingly fixed on a turret stage 1; a clutch device 4 is provided along the rotation shaft portion 2 so as to be capable of sliding in either direction, wherein the turret 3 is locked by the clutch device 4 in an indexing position so that the turret can be locked or unlocked in the indexing position by sliding in the direction of the rotation shaft; is caused to slide from a base end portion to a distal end portion to unlock the clutch device 4 whereupon the turret 3 becomes capable of rotating; and is caused to slide in the return direction at the indexing position after rotation so as to be locked by the clutch device 4 (i.e., the clutch is engaged) so as to be no longer capable of rotating.

Specifically, the automatic rotating-type turret device is configured so that a rotation gear portion that engages with a transmission gear driven by an indexing rotation drive device is provided to the turret 3; a clutch locking portion used as the clutch device 4 is provided to the turret stage 1; and a clutch engaging portion for detently and matingly engaging with the clutch locking portion is provided to the base end portion of the turret 3. The clutch locking portion and the clutch engaging portion disengage from each other and the turret 3 becomes capable of rotating when it slides from the base end portion to the distal end portion; and the indexing rotation drive device causes the turret 3 to be indexed by the rotation gear portion engaging with the transmission gear.

The automatic rotating-type turret device also has a hydraulic slide-drive mechanism comprising a fluid feed device for feeding a hydraulic slide-drive fluid; a clutch disengagement pressure chamber, into which the fluid is fed from the fluid feed device via a solenoid valve to slide the turret 3 in the shaft direction and unlock the clutch device 4; and a clutch pressure chamber, which is a slide gap that decreases in size when the turret 3 slides to disengage the clutch, wherein the solenoid value is switched so that the fluid is fed into the clutch pressure chamber, causing the turret 3 to slide in the return direction and the clutch device 4 to again lock the turret 3.

Work machinery of such description is subject to a large load during operation, particularly during lathe turning, in addition to the weight of the turret to which a plurality of tools are rotatably and switchably installed; and therefore a large clamping force is required. Therefore, as described above, there has been a need to use a hydraulic slide mechanism even for slidingly driving a turret in a conventional automatic rotating-type turret device, and a need to hold and maintain a clutch-engaged state, in which a secure lock is achieved by hydraulic pressure that generates the large clamping force, even after turret rotation concludes.

Also, while hydraulic pressure that generates the large clamping force (the turret slide-driving force in the reverse direction) is used to slide the turret in the reverse direction and lock the clutch device, the clutch device is configured so that the hydraulic pressure that generates the large clamping force slides the turret to unlock the clutch device. Therefore, in order to prevent the slide-driving force from being excessively large when the turret is caused to slide to enable rotation (i.e., to disengage the clutch), there is a need to design the clutch disengagement pressure chamber, into which the fluid is fed, to be as small as possible. Even in an instance where the clutch disengagement pressure chamber is designed to be significantly small, the slide-driving force may still be considerably large; as a result, when the sliding motion for disengaging the clutch narrows and fills the sliding gap, and surfaces come into contact, the pressing force due to hydraulic pressure may generate a large sliding friction resistance at the contact surface during clamp rotation.

In other words, the fact that hydraulic pressure is used to cause the turret to slide in the reverse direction and to hold and maintain the engaged state of the clutch device under pressure means that despite the device being capable of withstanding the large load generated during operation, there is also a possibility that a large slide pressing force due to the hydraulic pressure will result in a large sliding friction resistance being generated when the turret is turned after being caused to slide to disengage the clutch, resulting in more rapid wear and reduced durability as well as a possibility of galling during rotation.

Conventionally, in order to resolve such problems, there has been a need to provide a hydraulic pressure reducing mechanism or a similar mechanism, wherein a bypass channel becomes connected to the previously isolated clamp disengagement pressure chamber, the fluid is fed into a slide gap located opposite the clamp disengagement pressure chamber (i.e., the clutch pressure chamber) via the bypass channel, and the slide-driving force is reduced, when the feeding of the fluid into the clamp disengagement chamber exceeds a predetermined pressure or when the turret 3 slides in excess of a predetermined stroke, as shown, for example, in Unexamined Utility Model Application 57-149903.

This complicates the structure and control, and presents problems in that, for example, the device becomes more expensive and less adapted to mass-production, or that, for example, the unclamping speed when disengaging the clutch (i.e., to rotate the turret) has become slower.

Therefore, in order to minimize the use of hydraulics and limit resource consumption while also preventing excessive friction resistance from being generated during indexing when disengaging the clutch, there has been developed an innovative automatic rotating-type turret device (JP-A 2009-083070) that makes it possible to firmly lock and maintain a state in which the turret is in a clutch-engaged state so that it cannot rotate even using an air-pressure (i.e., pneumatic) slide-drive mechanism having an air feed device; and that has a wedge mechanism that makes it possible for the clutch position after sliding to adequately withstand the weight of the turret or a large cutting force even with use of a pneumatic slide-driving mechanism incapable of generating a driving force that can directly counter the slide cutting force (i.e., a force generated during lathe turning); thereby making it possible to remove hydraulics without adversely affecting turret rotation or the cutting function, and to reduce energy and resource consumption.

However, since the turret device has a configuration in which the turret is caused to slide in both directions along a rotation shaft portion, there is required a drive device for slidingly switching the turret between a locked position in which the clutch device is engaged and a rotatable position in which the clutch is disengaged, and a drive device for advancing or retracting the wedge portion so that the wedge portion engages with a wedge engaging portion when the clutch is in an engaged state, resulting in a structure that is still complex. Also, since the turret is of a "lift" type as described above, there is a higher risk of increased friction resistance during rotation and of ingress of dust or swarf, making it necessary to implement countermeasures and management measures, resulting in a complex structure.

SUMMARY OF THE INVENTION

An object of the present invention is to provide an innovative automatic rotating-type turret device for work machinery that is capable of solving the above-mentioned problems, in which yet a different approach is taken, and a non-lift-type turret is used. According to the configuration, a clutch device is capable of switching the turret between a locked state and a disengaged state using a single drive device (actuator); and a wedge effect is generated, without the weight of the turret or tools, load during cutting operation, or similar forces being directly borne. This configuration obviates the need for a large driving force capable of directly countering the load or a similar force, and accordingly obviates the need for hydraulics; i.e., makes it possible to firmly lock the turret even by using a small driving force generated by air or a motor, the use of which further reduces energy consumption and simplifies equipment. It also allows for a non-lift-type turret to be used, enabling the device to be fashioned using a simpler configuration.

A principle of the present invention will be described with reference to the attached drawings.

A first aspect of the present invention relates to an automatic rotating-type turret device for work machinery in which a turret 3 is rotatably provided on a turret stage 1 and to which is provided a clutch device 4 for detachably locking an indexing position of the turret 3, wherein there is provided a drive body 6 that is advanced or retracted by a drive device 5 in a direction that intersects the direction of a rotation axis of the turret 3; an axial-direction slide body 7 that is advanced or retracted in the direction of the rotation axis by the drive body 6 being advanced or retracted in the direction that intersects the direction of the rotation axis; and the clutch device 4, which is engaged or disengaged by the axial-direction slide body 7 being advanced or retracted; and there being provided to the drive body 6 a tapering action part 8 for generating an expanding action caused by the movement of the drive body 6 and pressingly sliding the axial-direction slide body 7 against the turret stage 1.

A second aspect of the present invention relates to the automatic rotating-type turret device for work machinery according to the first aspect, wherein the tapering action part 8 of the drive body 6 is configured so as to advance or retract between a support section 9 provided to the turret stage 1 and an opposing support section 10 provided to the axial-direction slide body 7; and a movement of the tapering action part 8 in a direction that intersects the direction of the rotation axis causes the opposing support section 10 to be pressed in a direction away from the support section 9 on a fixed side and the axial-direction slide body 7 to which the opposing support section 10 is provided to pressingly slide in the direction of the rotation axis.

A third aspect of the present invention relates to the automatic rotating-type turret device for work machinery according to the second aspect, wherein the tapering action part 8 for advancing and retreating between the support section 9 of the turret stage 1 and the opposing support section 10 of the axial-direction slide body 7 is formed so that at least the tapering action part 8 has a wedge shape having a tapering outer surface whose width gradually expands along one direction in which the tapering action part 8 advances or retracts; moving [the tapering action part 8] in a direction in which the spacing between the support section 9 and the tapering action part 8 gradually increases causes the axial-direction slide body 7 to pressingly slide in the direction of the rotation axis; and moving the tapering action part 8 in a reverse direction in which the spacing gradually narrows causes the axial-direction slide body 7 to reversedly slide.

A fourth aspect of the present invention relates to the automatic rotating-type turret device for work machinery according to the third aspect, wherein the tapering action part 8 comprises a pair of linear movement guide portions 12, for slidably engaging with a support engaging portion 11 provided to the support section 9 and the opposing support section 10, respectively, and for integrally sliding in both directions; the tapering action part 8 is formed as a wedge shape having the tapering outer surface formed by at least one of the linear movement guide portions 12, the linear movement guide portions 12 being provided side-by-side in a non-parallel arrangement and at least the one of the linear movement guide portions 12 is configured in an inclined state so that the spacing between the linear movement guide portions 12 disposed side by side gradually increases; and driving the drive body 6 causes the tapering action part 8 comprising the non-parallel pair of linear movement guide portions 12 to slide on each of the support engaging portions 11, whereby the expanding action is generated and the axial-direction slide body 7 is caused to pressingly slide against the turret stage 1 in the direction of the rotating axis.

A fifth aspect of the present invention relates to the automatic rotating-type turret device for work machinery according to any of the first through fourth aspects, wherein a rotation shaft portion 2 is provided to the turret stage 1; the turret 3 is configured so as to be rotatable about the rotation shaft portion 2 relative to the turret stage 1; the axial-direction slide body 7 is slidably provided to the rotation shaft portion 2; and a clutch device 4 is provided between the axis-direction slide body 7 and the turret 3, the clutch device 4 being engaged and disengaged by the sliding movement of the axial-direction slide body 7 to switch between a state in which the turret 3 is capable of rotating and a clutch-engaged state in which the indexing position is locked.

A sixth aspect of the present invention relates to the automatic rotating-type turret device for work machinery according to the fifth aspect, wherein the clutch device 4 is configured so that an outer rim portion 13 is provided to the turret stage 1 or the turret 3; an inner rim portion 14 surrounded by the outer rim portion 13 is provided to the turret 3 or the turret stage 1; the inner rim portion 14 rotates relative to the outer rim portion 13 when the turret 3 is caused to rotate relative to the turret stage 1 and indexed; a locking portion 15 for engaging with the outer rim portion 13 and the inner rim portion 14 and locking the rotation of the inner rim portion 14 relative to the outer rim portion 13 is provided to the axial-direction slide body 7; and the drive device 5 drives the tapering action part 8, causing the axial-direction slide body 7 to pressingly slide in the direction of the rotation axis, whereby the locking portion 15 is caused to engage with the outer rim portion 13 and the inner rim portion 14, and the turret 3 is locked and immobilized at the indexing position, so that a clutch-engaged state is obtained.

Since the present invention is configured as described above, there is provided an innovative automatic rotating-type turret device for work machinery in which a non-lift-type turret is used. According to the configuration, a clutch device is capable of switching the turret between a locked state and a disengaged state using a single drive device (actuator); and a wedge effect is generated, without the weight of the turret or tools, load during cutting operation, or similar forces being directly borne. This configuration obviates the need for a large driving force capable of directly countering the load or a similar force, and accordingly obviates the need for hydraulics; i.e., makes it possible to firmly lock the turret even by using a small driving force generated by air or a motor, the use of which further reduces energy consumption and simplifies equipment. It also allows for a non-lift-type turret to be used, enabling the device to be fashioned using a simpler configuration.

In other words, there is provided an innovative automatic rotating-type turret device for work machinery in which the clutch device can be engaged or disengaged using one drive device; and in which a wedge effect is generated, making it possible to firmly lock the turret in the indexing position, and unlock the turret from it, even when the drive device comprises an air cylinder device, an electric motor, or another drive device that does not generate a large driving force sufficient to directly counter a large load during cutting operation.

According to the second, third, and fourth aspects of the invention, there is provided a highly innovative automatic rotating-type turret device for work machinery in which it is possible to obtain, using an even simpler configuration, the tapering action part for generating a wedge effect described above and, by being advanced and retracted, for causing the drive body to pressingly slide and engage the clutch device. According to the fourth aspect of the invention in particular, it is possible to obtain the tapering action part using an even simpler configuration, and the tapering action part can be advanced or retracted in a smooth manner.

According to the fifth and sixth aspects of the invention, there is provided a highly innovative automatic rotating-type turret device for work machinery in which it is possible to obtain a clutch device using an even simpler configuration. According to the sixth aspect in particular, it is also possible to obtain a clutch device having a firm locking action, being of a simple configuration, and having superb durability and enhanced practicality.

DESCRIPTION OF THE PREFERRED EMBODIMENTS

Figure 1:
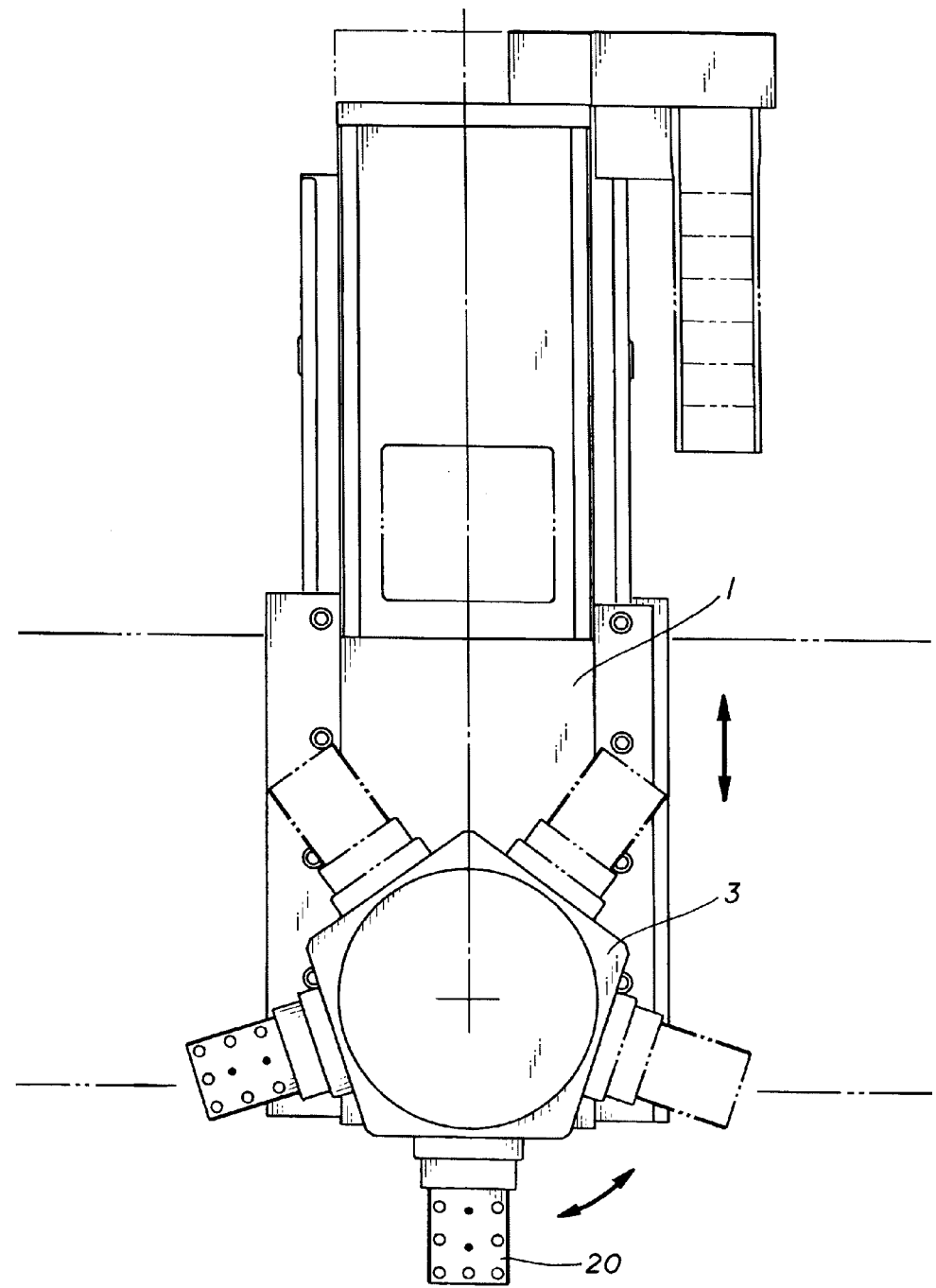
FIG. 1 is a schematic front view of the present embodiment.
Figure 2:
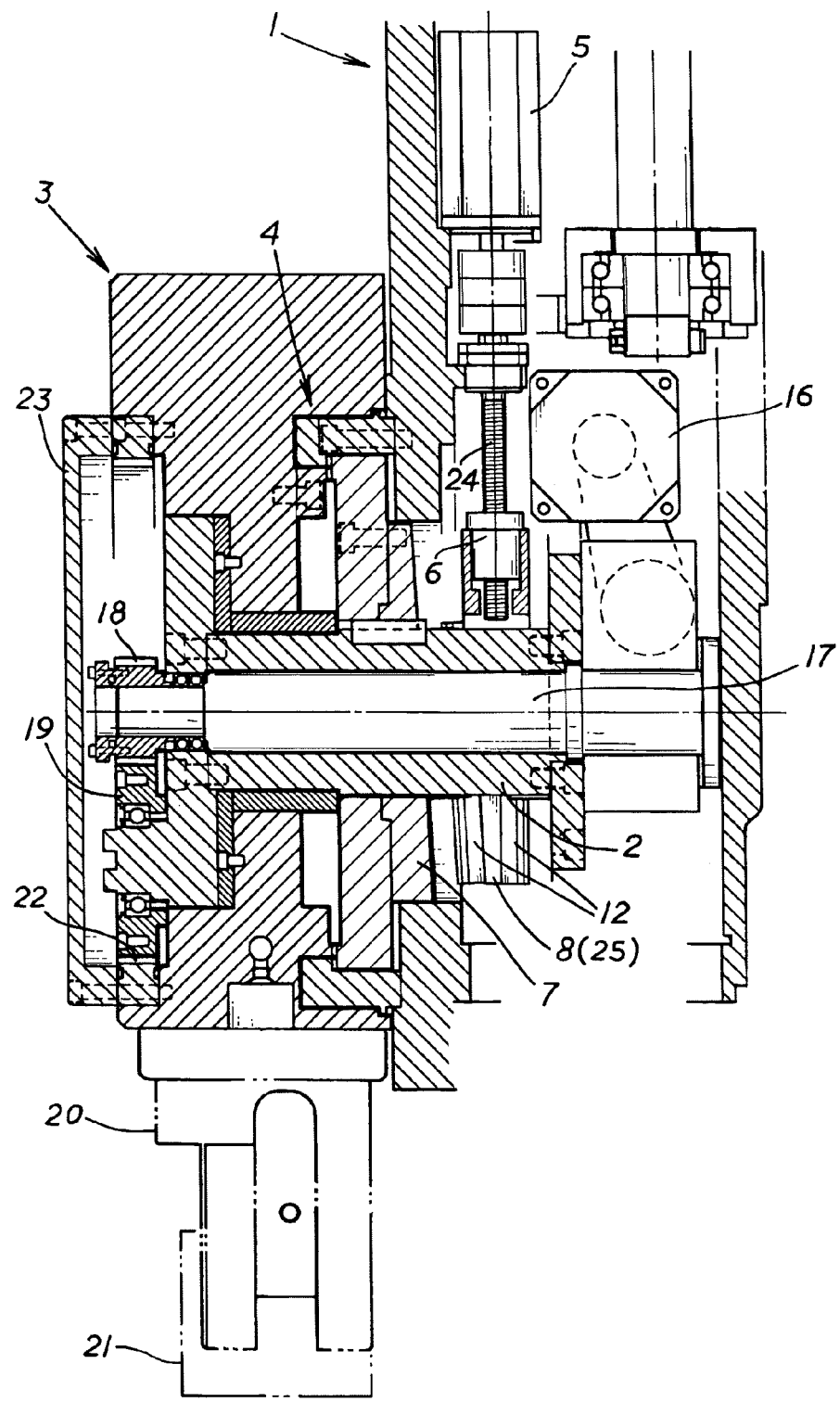
FIG. 2 is a schematic side cross-sectional view of the present embodiment.
Figure 3:
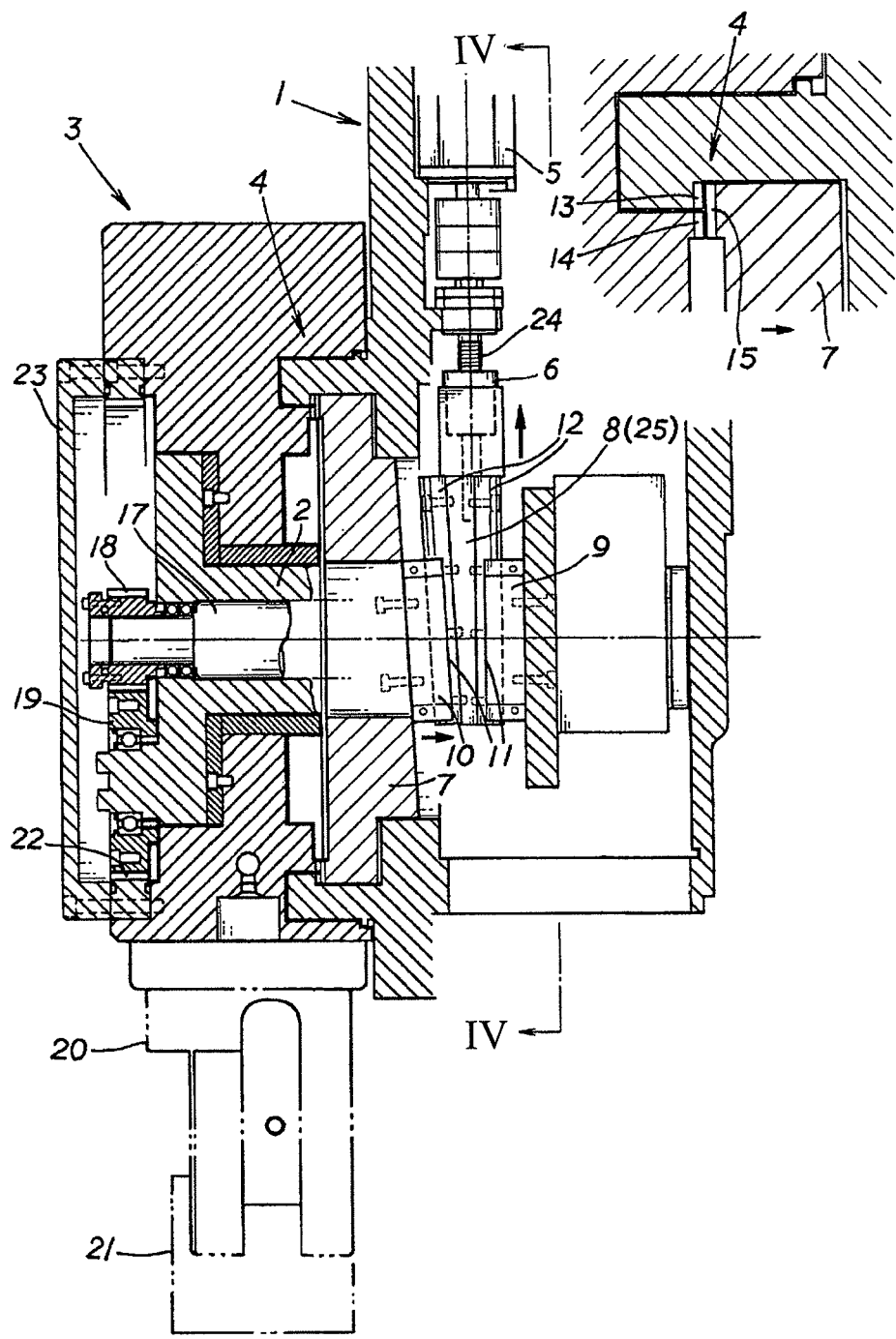
FIG. 3 is a schematic side cross-sectional view of the present embodiment in a clutch-disengaged state in which the clutch device is disengaged and the turret is capable of rotating.
Figure 4:
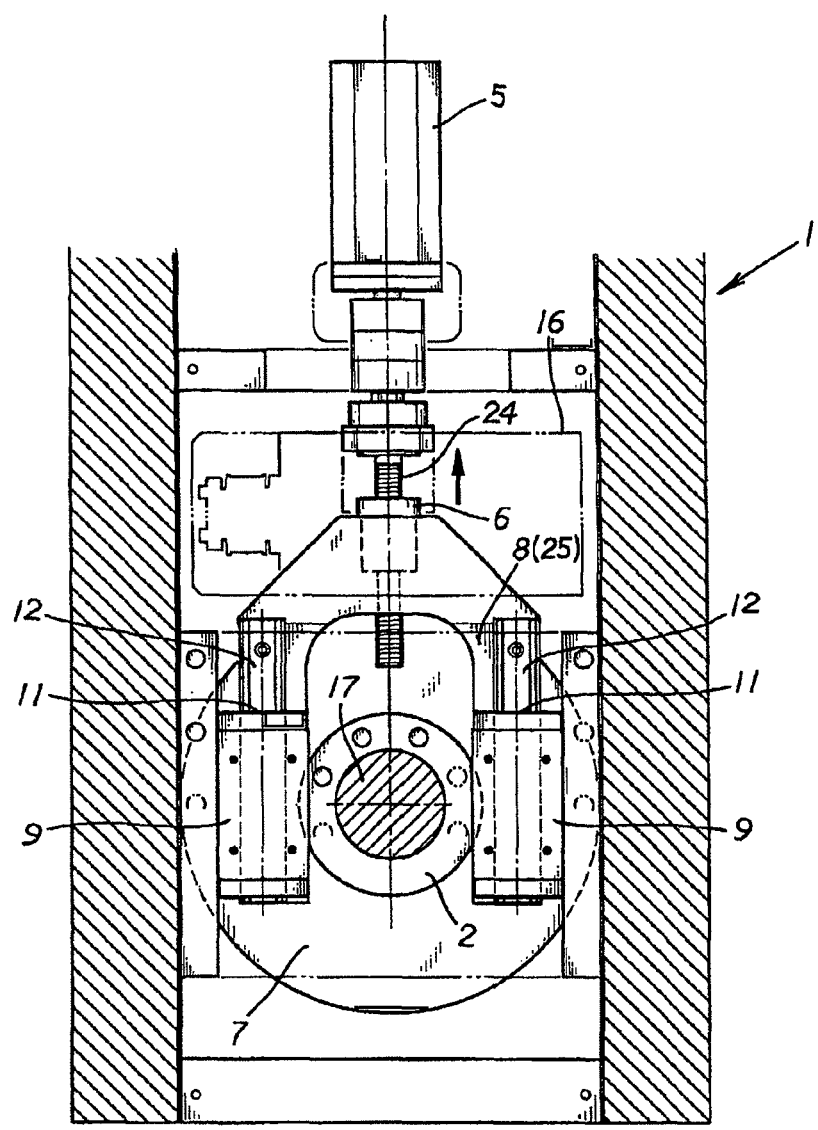
FIG. 4 is a cross-sectional view of the present embodiment, taken along in FIG. 3.
Figure 5:
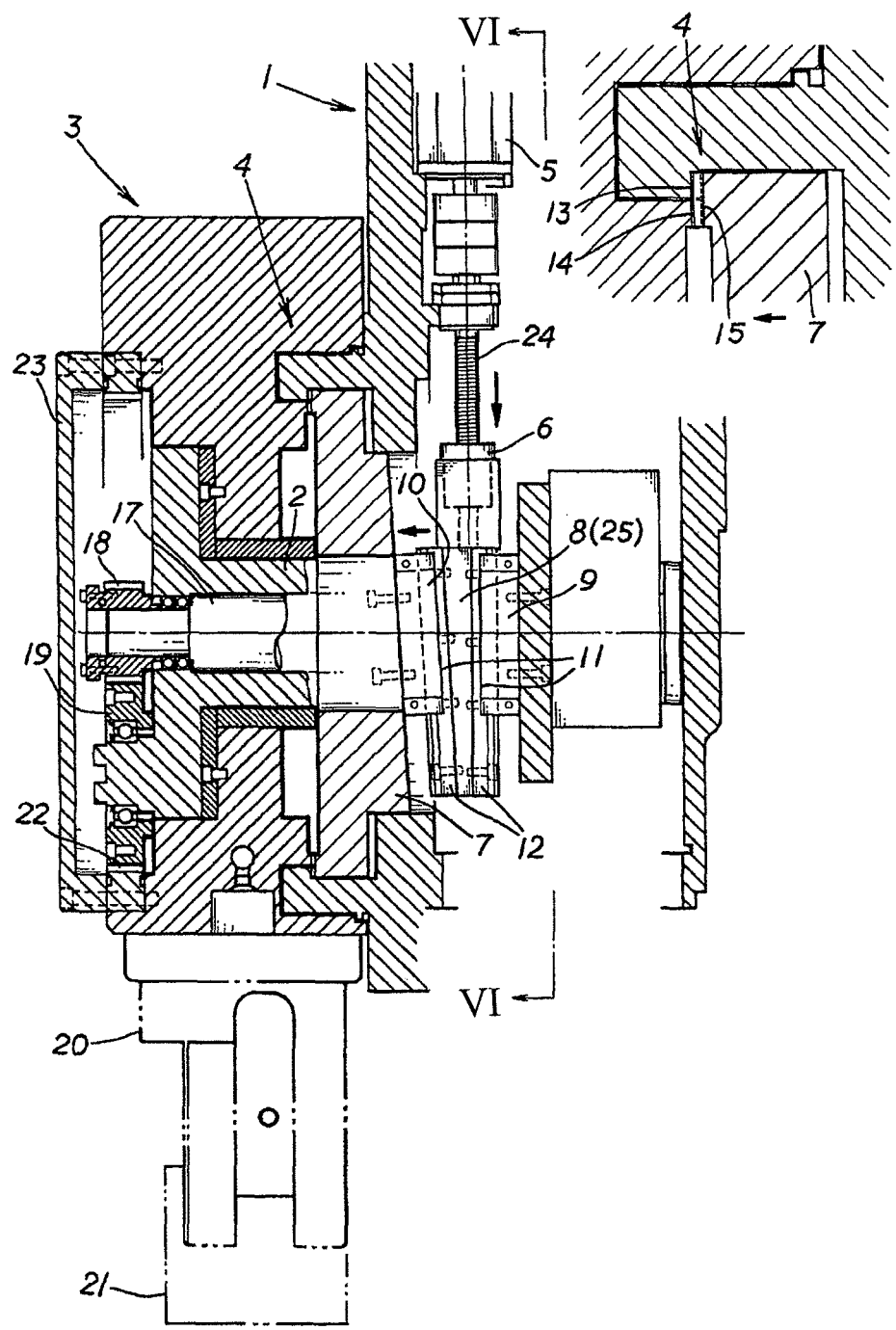
FIG. 5 is a schematic cross-sectional view of the present embodiment in a state in which the clutch is engaged.
Figure 6:
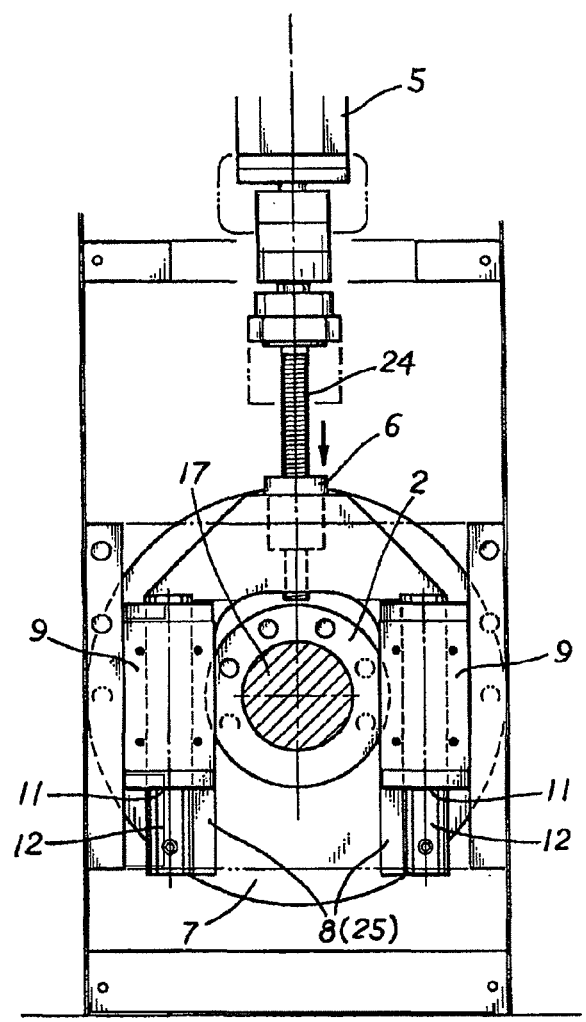
FIG. 6 is a cross-sectional view of the present embodiment, taken along in FIG. 5.
Figure 7:
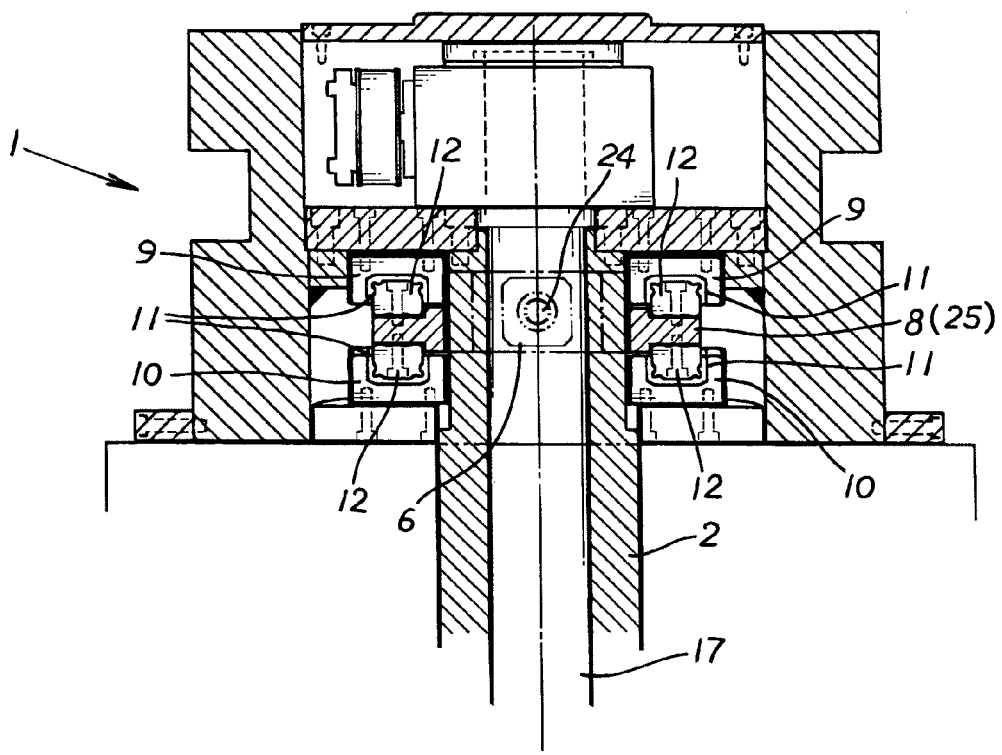
FIG. 7 is a schematic cross-sectional plan view of the present embodiment in a state in which the clutch is disengaged.
Figure 8:
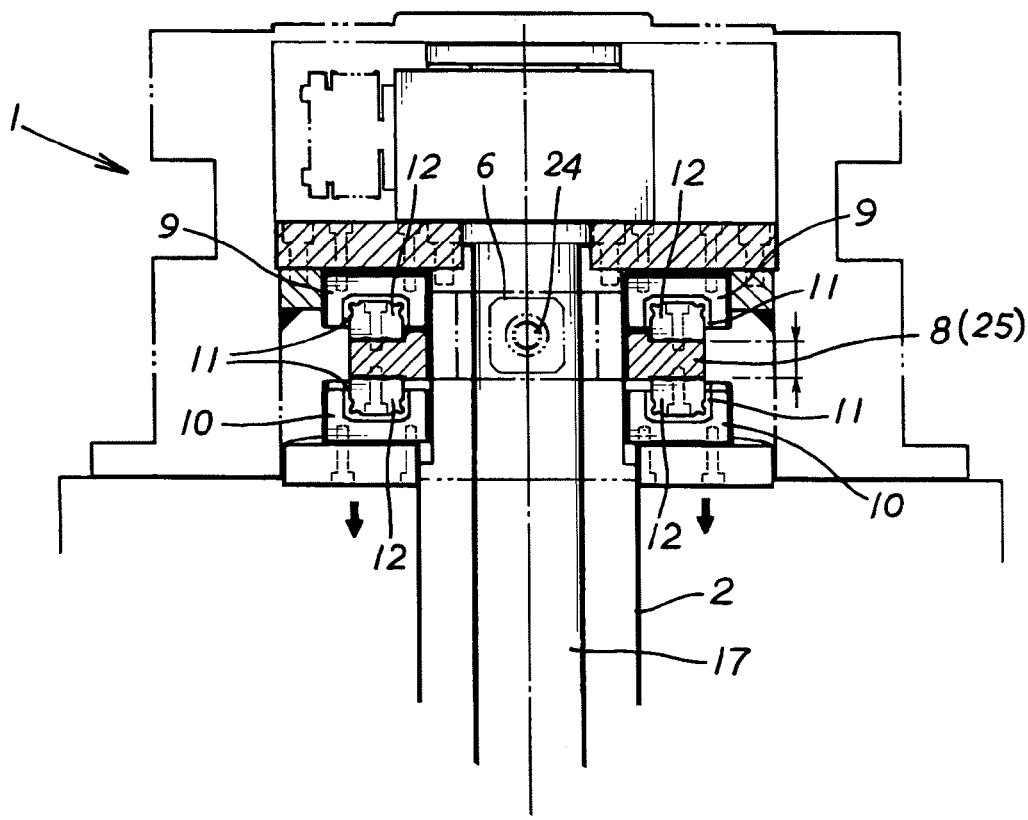
FIG. 8 is a schematic cross-sectional plan view of the present embodiment in a state in which the clutch is engaged.
Figure 9:
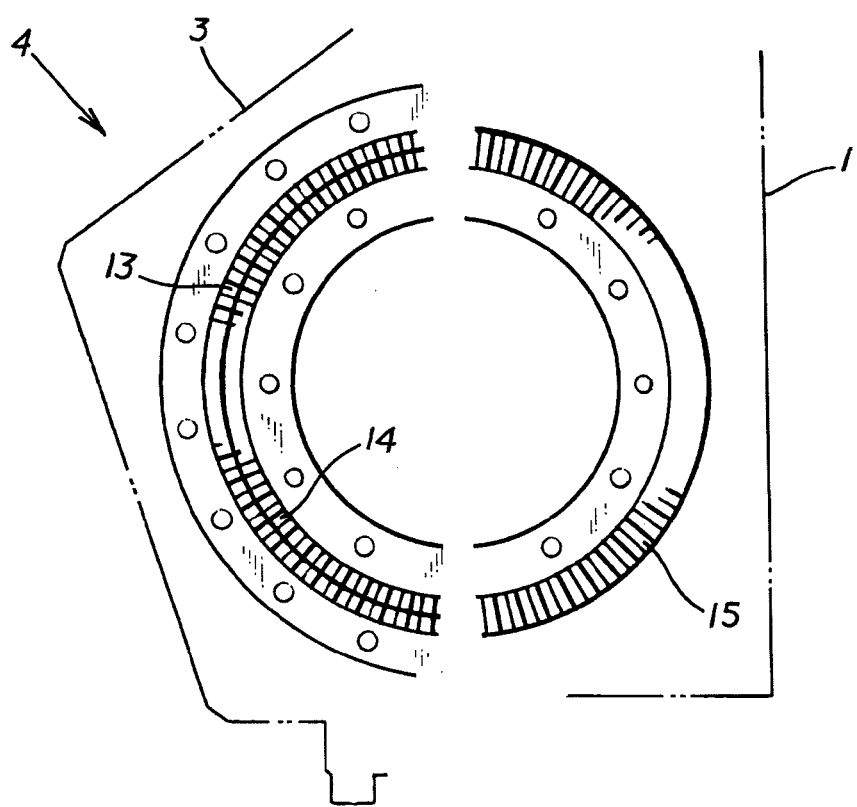
FIG. 9 is a schematic diagram of a curvic coupling used as the clutch device according to the present embodiment.
Figure 9:
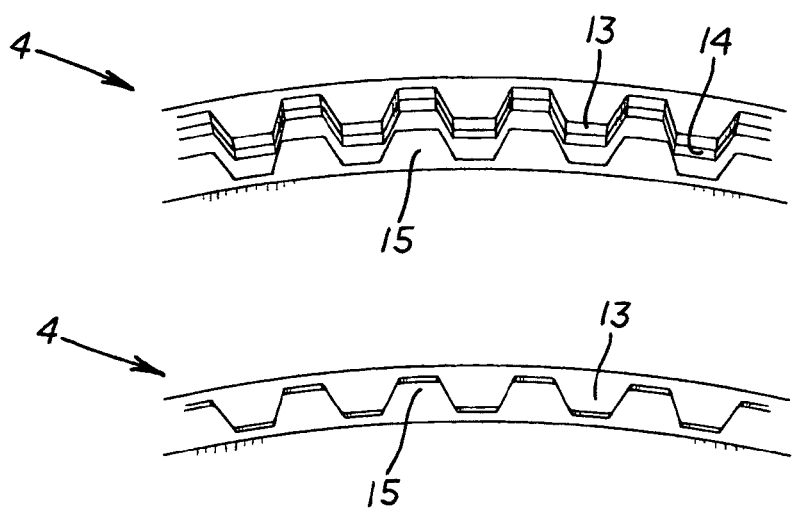
Figure 10:
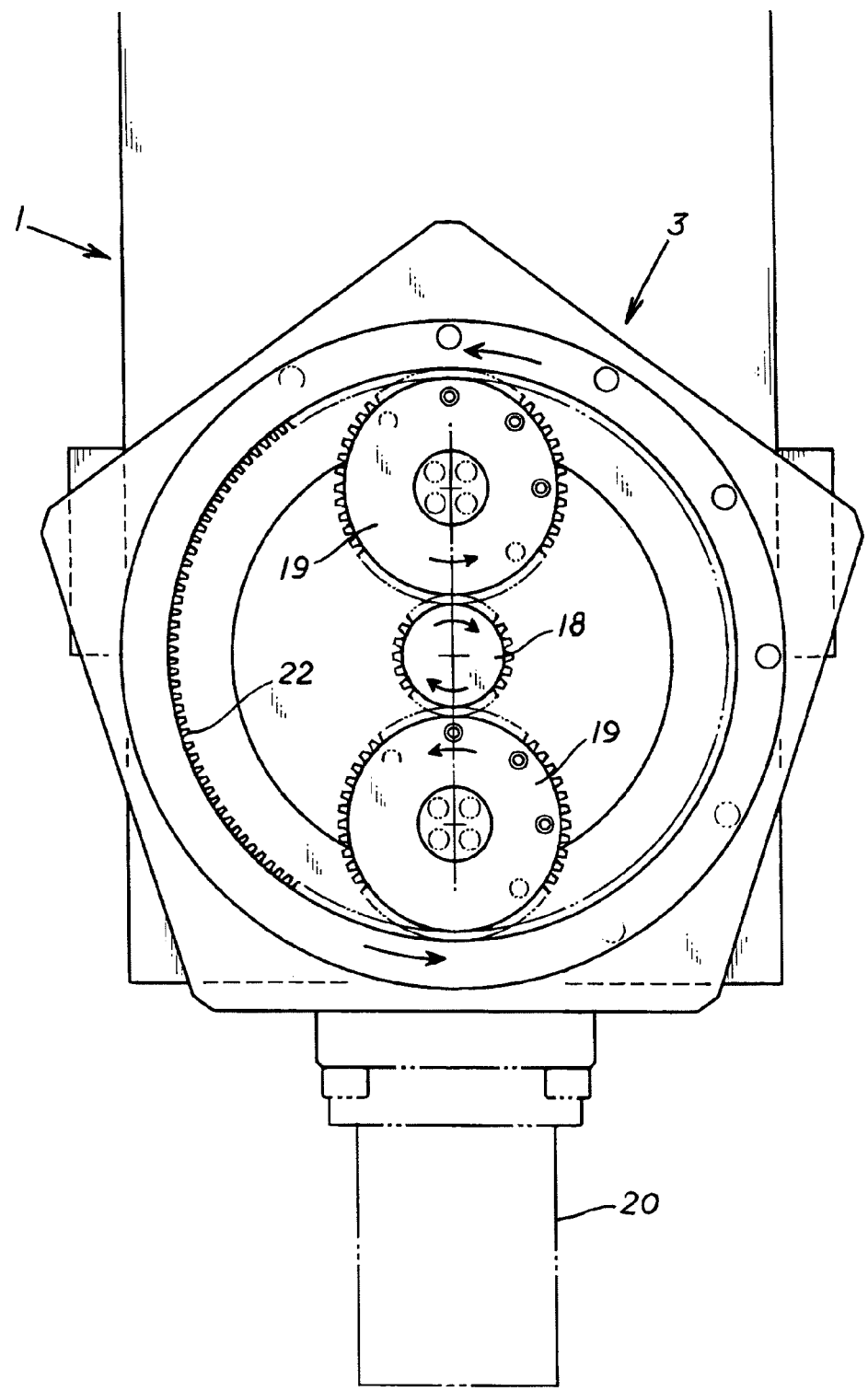
FIG. 10 is a schematic cross-sectional front view showing a turret rotation transmission mechanism according to the present embodiment.

Preferred embodiments of the present invention (i.e., how to implement the invention) will be briefly described hereinafter with reference to the accompanying drawings.

When the drive device 5 drives the drive body 6 and causes the tapering action part 8 provided to the drive body 6 to slide, the shape of the tapering action part 8 or the shape of a contact portion with the tapering action part 8 interposed generates an expanding action; the axial-direction slide body 7, which is a moving part, slides against the turret stage 1, which is a fixed part, in the direction of the rotating axis; and the clutch device 4 engages or disengages.

For example, when the drive body 6 causes the tapering action part 8 to slide in a direction orthogonal to the direction of the rotation axis, an expanding action generated by the tapering action part 8 causes the axial-direction slide body 7 to pressingly slide along the direction of the rotation axis, the locking portion 15 locks onto the turret 3, the clutch device 4 enters an engaged state, and the turret 3 locks in the indexing position.

When the tapering action part 8 is caused to slide in a reverse direction, the axial-direction slide body 7 reversedly slides, the clutch device 4 unlocks, and the turret 3 switches to a rotatable state.

After indexing, the drive device 5 again causes the tapering action part 8 to slide, an expanding action generated by the tapering action part 8 causes the axial-direction slide body 7 to pressingly slide, and the locking portion 15 locks onto the turret 3 and locks the turret 3 in the indexing position (i.e., the clutch becomes engaged).

In other words, a state in which the clutch is engaged, where the axial-direction slide body 7 is caused to pressingly slide in the direction of the rotation axis and the turret 3 is locked using the clutch device 4, is brought about by an expanding action generated by the tapering action part 8 driven by the drive device 5 in a lateral direction that intersects with the direction of the rotation axis. Therefore, the tapering action part 8 simultaneously generates a wedge effect, making it possible to lock and hold the turret 3 at a strength capable of withstanding a large load generated during a cutting operation, even when the driving force of the drive device 5 that slidingly drives the tapering action part 8 is not one that is sufficiently large to directly counter such a load.

Therefore, the present invention provides an innovative automatic rotating-type turret device for work machinery, in which the turret 3 is of a non-lift-type, therefore minimizing the risk of an increase in frictional resistance on the turret 3 or of the ingress of dust or swarf as well as minimizing the need for countermeasures and management measures to prevent such problems. One drive device can be used to lock and unlock the clutch device, and to also generate a wedge effect, reducing the size of the driving force required from the drive device. This makes it possible to configure the drive device using, for example, an air cylinder device, or an electric motor for causing a ball screw to rotate and driving a drive body 6 comprising a nut provided to the ball screw; reducing energy consumption; and making it possible to simplify equipment.

Embodiments

A specific embodiment of the present invention will now be described with reference to the drawings.

According to the present embodiment, a rotation shaft portion 2 is provided to the turret stage 1; the turret 3 is configured so as to be capable of rotating about the rotation shaft portion 2 relative to the turret stage 1; the axial-direction slide body 7 is slidably provided to the rotation shaft portion 2; and a clutch device 4, engaged and disengaged by a sliding movement of the axial-direction slide body 7 to thereby switch between a state in which the turret 3 is capable of rotating and a clutch-engaged state in which the turret 3 is locked in the indexing position, is provided between the axial-direction slide body 7 and the turret 3.

Also, according to the present embodiment, there is provided a drive body 6 that is advanced or retracted by a drive device 5 in a direction that intersects the direction of an axis of rotation of the turret 3; and a tapering action part 8 for generating an expanding action caused by an advancing or retreating movement of the drive body 6 in a direction orthogonal to the axis and pressingly sliding the axial-direction slide body 7 against the turret stage 1 in the direction of the axis is provided to the drive body 6; wherein the sliding movement of the tapering action part in the direction orthogonal to the axis causes the axial-direction slide body 7 to slide along the direction of the axis and the clutch device 4 to engage or disengage.

Specifically, the tapering action part 8 of the drive body 6 is configured so as to advance or retract between a support section 9 provided to the turret stage 1 and an opposing support section 10 provided to the axial-direction slide body 7, and the movement of the tapering action part 8, which is between the support section 9 and the opposing support section 10, causes the opposing support section 10 to be pressed in a direction away from the support section 9 on a fixed side and the axial-direction slide body 7 is caused to slide in a pressing manner.

In other words, the tapering action part 8 for advancing and retreating between the support section 9 of the turret stage 1 and the opposing support section 10 of the axial-direction slide body 7 may be configured so that the support section 9 is shaped so as to generate a tapering effect; however, according to the present embodiment, the tapering action part 8 is formed to have a wedge shape having a tapering outer surface whose width gradually expands along one direction in which the tapering action part 8 advances or retracts, wherein moving the tapering action part 8 in a direction in which the width of a portion that is inserted between the support section 9 and the opposing support section 10 gradually increases will cause the axial-direction slide body 7 to pressingly slide and the clutch to engage; and reversedly moving the tapering action part 8 in a direction in which the width gradually narrows will cause the axial-direction slide body 7 to reversedly slide and the clutch to disengage.

The tapering action part 8 may be a block wedge that is caused to forcibly slide into a space between the support section 9 and the opposing support section 10; however, according to the present embodiment, the tapering action part 8 comprises a pair of linear movement guide portions 12 for slidably engaging with a support engaging portion 11 provided to the support section 9 and the opposing support section 10, respectively; wherein the linear movement guide portions 12 are integrally linked so that the advancing or retreating movement causes the linear movement guide portions 12 to slide integrally; the tapering action part 8 is formed as a wedge shape having the tapering outer surface formed by at least one of the linear movement guide portions 12, the linear movement guide portions 12 being provided side-by-side in a non-parallel arrangement and at least the one of the linear movement guide portions 12 is configured in an inclined state so that the spacing between the linear movement guide portions 12 gradually increases; and driving the drive body 6 causes the tapering action part 8 comprising the non-parallel pair of linear movement guide portions 12 to slide on each of the support engaging portions 11, whereby the expanding action is generated and the axial-direction slide body 7 is caused to pressingly slide against the turret stage 1.

The present embodiment shall now be described in further detail. A turning shaft 17 that is turned by an indexing drive device 16 is internally provided to the rotation shaft portion 2; a distal end gear 18 is provided to a distal end portion of the turning shaft 17; a pair of intermediate transmission gears 19 for engaging with the distal end gear 18 are provided in an opposing state with the distal end gear 18 interposed therebetween; and a ring gear 22 for engaging with each of the intermediate transmission gears 19 is provided as an internal gear to a distal end cover portion 23 of the turret 3. The indexing drive device 16 turns the turning shaft 17, turning the distal end gear 18, intermediate transmission gear 19, and ring gear 22; and causing the turret 3 to index about the rotation shaft portion 2 to which the turning shaft 17 is internally provided.

The turret 3 turnably engages the rotation shaft portion 2, and does not slide in the direction of the rotation axis. The turret 3 is of a non-lift type.

The axial-direction slide body 7 is slidably provided along the rotation shaft portion 2 to a base end side of the turret 3.

A clutch device 4 is provided between the axial-direction slide body 7 and the turret 3, the clutch device used for causing the axial-direction slide body 7 to slide and thereby switching between a non-clutch-engaged state in which the turret 3 is capable of rotating and a clutch-engaged state in which the turret 3 is locked in the indexing position.

A curvic coupling is used as the clutch device 4. In other words, although an outer rim portion 13 may be provided to either of the turret stage 1 or the turret 3, according to the present embodiment, an outer rim portion 13 is provided to an inner perimeter of a protruding portion of the turret stage 1, which corresponds to a fixed side; and an inner rim portion 14 is provided to a suspended portion of the turret 3. The inner rim portion 14 rotates relative to the outer rim portion 13 when the turret 3 is caused to rotate relative to the turret stage 1 and indexed. A locking portion 15 for engaging with the outer rim portion 13 and the inner rim portion 14 and locking the rotation of the inner rim portion 14 relative to the outer rim portion 13 is provided to the axial-direction slide body 7. The drive device 5 drives the tapering action part 8, causing the axial-direction slide body 7 to pressingly slide in the direction of the rotation axis, thereby causing the locking portion 15 to engage with the outer rim portion 13 and the inner rim portion 14, locking the turret 3 in the indexing position, and engaging the clutch.

A further description shall now be provided of a clutch engaging/disengaging wedge mechanism for pressingly sliding the axial-direction slide body 7 for operating the clutch device 4 to obtain the clutch-engaged state and for generating a wedge effect according to the present invention.

Only one drive device 5 is required. The drive device 5 does not have to be a hydraulic device which generates a large clamping force, and may instead comprise an air cylinder device. However, in the present embodiment there is used an electric motor, which consumes even less energy, requires even less equipment investment, and is even easier to manage. The electric motor turns a ball screw 24 and thereby causes the drive body 6 screwed to the ball screw 24 to advance and retract. The tapering action part 8 is provided to the drive body 6.

The tapering action part 8 constitutes a wedge portion. The tapering action part 8 moves between the turret stage 1, which corresponds to a fixed side, and the axial-direction slide body 7, which corresponds to a driven side; and presses up and drives the axial-direction slide body 7. However, according to the present embodiment, it is not merely that the support section 9 of the turret stage 1 and the opposing support section 10 of the axial-direction slide body 7 are the sliding contact surfaces, as described above; rather, the support engaging portion 11 is provided to each of the support section 9 and the opposing support section 10; and a pair of linear movement guide portions 12 are provided for slidably engaging the support engaging portion 11. The linear movement guide portions 12 constitute the tapering action part 8, and the shape of the linear movement guide portions 12 generates a tapering action (expanding action) and produces a tapering effect.

Specifically, a conventional LM guide is modified, a sliding side that slidably engages with the linear movement guide rail is fixed, in the form of the support engaging portion 11, to each of the resulting linear movement guide rails, and the guide rail that slides against the sliding side (support engaging portion 11) constitutes the linear movement guide portion 12, wherein the drive device 5 drives the linear movement guide portions 12 and causes them to slide.

One of the linear movement guide portions 12 is inclined so that the linear movement guide portions 12 are not parallel, whereby according to the present embodiment, the spacing between the side-by-side linear movement guide portions 12 gradually and slightly narrows towards the distal end side.

Specifically, according to the present embodiment, an end surface for providing the support section 9 is provided to the turret stage 1, which corresponds to the fixed side; an end surface of the opposing axial-direction slide body 7 is formed as an inclined end surface; the support engaging portion 11 is provided to each of the end surface and the inclined end surface; the support section 9 is provided to the turret stage 1; the opposing support section 10 is provided to the axial-direction slide body 7; and the linear movement guide portions 12 are slidably engaged with each of the support engaging portions 11. One of the linear movement guide portion 12, which is not in a parallel arrangement with the other linear movement guide portion 12, but is disposed along the inclined end surface, is slidably engaged with the support engaging portion 11 provided as the opposing support section 10 to the inclined end surface of the axial-direction slide body 7; and the linear movement guide portion 12 is caused to slide towards the distal end side using the linear movement guide portions 12 as a tapering surface, thereby causing the axial-direction slide body 7 to pressingly slide in the direction orthogonal to the movement of the linear movement guide portions 12.

It is accordingly possible for an advancing or a retreating sliding motion to be achieved in a smooth manner. The axial-direction slide body 7 is caused to pressingly slide by a small distance sufficient to lock the locking portion 15 and engage the clutch device 4. The direction in which the drive device 5 drives the drive body 6 and the tapering action part 8 is orthogonal to the direction in which the axial-direction slide body 7 pressingly slides; therefore, the configuration generates a sufficient wedge effect.

According to the present embodiment, as described above, the linear movement guide portions 12 are configured so that the linear movement guide portion 12 that slidably engages with the support engaging portion 11 of the opposing support section 10 provided to the axial-direction slide body 7 that corresponds to the moving side is slightly non-parallel relative to the linear movement guide portion 12 that slidably engages with the support engaging portion 11 of the support section 9 provided to the turret stage 1 that corresponds to the fixed side, and the non-parallel linear movement guide portions 12 constitute the tapering action part 8 as the tapering part.

More specifically, the linear movement guide portions 12 are reinforcedly connected by a connecting part 25, and are integrally provided to the drive body 6 along with the connecting part 25.

Two pairs of the linear movement guide portions 12 are symmetrically provided with the rotation shaft portion 2 positioned therebetween, with a total of four linear movement guide portions 12 protrudingly provided to the drive body 6.

Specifically, two linear movement guide portions 12 that slidably engage with the support engaging portion 11 of the support section 9 provided to the turret stage 1 corresponding to the fixed linear side are provided to the drive body 6 caused by the drive device 5 to advance or retract in the direction orthogonal to the direction of the rotation axis, the linear movement guide portions 12 being provided in a pair so as to avoid the rotation shaft portion 2. The linear movement guide portions 12 on the inclined side that slidably engage with the support engaging portion 11 of the opposing support section 10 provided on the inclined end surface of each of the axial-direction slide body 7 so as to be non-parallel in the direction of the rotating axis relative to each of the linear movement guide portions 12 on the linear side are connected by the connecting part 25 to the linear movement guide portions 12 that slidably engage with the fixed side.

In other words, a pair of linear movement guide portions 12 are provided on each of the two sides of the interposed rotation shaft portion 2 (resulting in a total of four linear movement guide portions 12). The linear movement guide portions 12 are configured so that the spacing between each of them provided side by side in a non-parallel manner narrows slightly towards the distal end side, forming a tapering action part 8 having a tapering part formed on one side. Sliding the tapering action part 8 provided to the drive body 6 towards the distal end side (i.e., in one of the directions orthogonal to the direction of the rotation axis) generates a tapering action that presses the axial-direction slide body 7 upwards relative to the turret 3 since the spacing between a pair of linear movement guide portions 12 provided side by side gradually increases between the support section 9 and the opposing support section 10, and the tapering action causes the axial-direction slide body 7 to pressingly slide.

Therefore, according to the present embodiment, there is provided a highly innovative automatic rotating-type turret device for work machinery, in which the axial-direction slide body 7 pressingly slides to engage the clutch device 4, making it possible to lock the turret 3 in the indexing position. The sliding action of the axial-direction slide body 7 is driven by the tapering action part 8 forcibly inserted from an orthogonal direction, generating a wedge effect, making it possible for locking and immobilizing to be accomplished using a small clamping force that cannot directly counter the load generated during cutting, and also for unlocking to be achieved using a small force, making it possible to engage and lock the clutch device using an air cylinder device or an electric motor. An advancing or retreating movement of the linear movement guide portions 12 of the LM guide is used to return to a non-clutch-engaged state in which the turret 3 is capable of rotating, therefore making it possible to perform the declutching operation in a smooth manner. The switching operation can be performed very smoothly, and engaging and disengaging conducted in a reliable manner.

The present invention is not limited in scope to the present embodiment; specific configurations of each of the constituent features may be designed as appropriate.

What is claimed is:

1. An automatic rotating turret device for work machinery in which a turret is rotatably provided on a turret stage, comprising:
   a clutch device for detachably locking the turret to an indexing position;
   a drive body that is advanced or retracted by a drive device in a direction that intersects the direction of an axis of rotation of the turret;
   an axial-direction slide body that is advanced or retracted in the direction of the rotation axis by the drive body being advanced or retracted in the direction that intersects the direction of the rotation axis, so that the axial-direction slide body moves in a direction orthogonal to a direction in which the drive body moves;
   the clutch device is engaged or disengaged by the axial-direction slide body being advanced or retracted; and
   a tapering action part configured to be moved by the drive body and configured to pressingly slide against the axial-direction slide body to cause the axial-direction slide body to press against the turret stage.

2. The automatic rotating turret device for work machinery according to claim 1, wherein the tapering action part of the drive body is configured so as to advance or retract between a support section provided to the turret stage and an opposing support section provided to the axial-direction slide body; and a movement of the tapering action part in a direction that intersects the direction of the rotation axis causes the opposing support section to be pressed in a direction away from the support section on a fixed side and the axial-direction slide body to which the opposing support section is provided to pressingly slide in the direction of the rotation axis.

3. The automatic rotating turret device for work machinery according to claim 2, wherein the tapering action part for advancing and retreating between the support section of the turret stage and the opposing support section of the axial-direction slide body is formed so that at least the tapering action part has a wedge shape having a tapering outer surface whose width gradually expands along one direction in which the tapering action part advances or retract; moving the tapering action part in a direction in which the spacing between the support section and the tapering action part gradually increases causes the axial-direction slide body to pressingly slide in the direction of the rotation axis; and moving the tapering action part in a reverse direction in which the spacing gradually narrows causes the axial-direction slide body to reversedly slide.

4. An automatic rotating turret device for work machinery in which a turret is rotatably provided on a turret stage, comprising:
   a clutch device for detachably locking the turret to an indexing position;
   a drive body that is advanced or retracted by a drive device in a direction that intersects the direction of an axis of rotation of the turret;
   an axial-direction slide body that is advanced or retracted in the direction of the rotation axis by the drive body being advanced or retracted in the direction intersects the direction of the rotation axis;
   the clutch device is engaged or disengaged by the axial-direction slide body being advanced or retracted; and
   a tapering action part for generating an expanding action caused by the movement of the drive body and pressingly sliding the axial-direction slide body against the turret stage,
   wherein the tapering action part of the drive body is configured on as to advance or retract between a support section provided to the turret stage and an opposing support section provided to the axial-direction slide body; and a movement of the tapering action part in a direction that intersects the direction of the rotation axis causes the opposing support section to be pressed in a direction away from the support section on a fixed side and the axial-direction slide body to which the opposing support section is provided to pressingly slide in the direction of the rotation axis,
   wherein the tapering action part for advancing and retreating between the support section of the turret stage and the opposing support section of the axial-direction slide body is formed so that at least the tapering action part has a wedge shape having a tapering outer surface whose width gradually expands along one direction in which the tapering action part advances or retract; moving the tapering action part in a direction in which the spacing between the support section and the tapering action part gradually increases causes the axial-direction slide body to pressingly slide in the direction of the rotation axis; and moving the tapering action part in a reverse direction in which the spacing dually narrows causes the axial-direction slide body to reversedly slide,
   wherein the tapering action part comprises a on-parallel pair of linear movement guide portions for slidably engaging with a support engaging portion provided to the support section and the opposing support section, respectively, and for integrally sliding in both directions; the tapering action part is formed as a wedge shape having the tapering outer surface formed by at least one of the linear movement guide portions, the linear movement guide portions being provided side-by-side in a non-parallel arrangement and at least the one of the linear movement guide portions being configured in an inclined state so that the spacing between the linear movement guide portions disposed side by side gradually increases; and driving the drive body causes the tapering action part comprising the non-parallel pair of linear movement guide portions to slide on each of the support engaging portions, whereby the expanding action is generated and the axial-direction slide body is caused to pressingly slide against the turret stage in the direction of the rotating axis.

5. The automatic rotating turret device for work machinery according to any of claims 1 through 4, wherein a rotation shaft portion is provided to the turret stage; the turret is configured so as to be capable of rotating about the rotation shaft portion relative to the turret stage; the axial-direction slide body is slidably provided to the rotation shaft portion; and the clutch device is provided between the axial-direction slide body and the turret, the clutch device being engaged and disengaged by the sliding movement of the axial-direction slide body to switch between a state in which the turret is capable of rotating and a clutch-engaged state in which the turret is locked at the indexing position.

6. The automatic rotating turret device for work machinery according to claim 5, wherein the clutch device is configured so that an outer rim portion is provided to the turret stage or the turret; an inner rim portion surrounded by the outer rim portion is provided to the turret or the turret stage; the inner rim portion rotates relative to the outer rim portion when the turret is caused to rotate relative to the turret stage and indexed; a locking portion for engaging with the outer rim portion and the inner rim portion and locking the rotation of the inner rim portion relative to the outer rim portion is provided to the axial-direction slide body; and the drive device drives the tapering action part, causing the axial-direction slide body to pressingly slide in the direction of the rotation axis, whereby the locking portion is caused to engage with the outer rim portion and the inner rim portion, and the turret is locked and immobilized at the indexing position so that a clutch-engaged state is obtained.

* * * * *

UNITED STATES PATENT AND TRADEMARK OFFICE
CERTIFICATE OF CORRECTION

PATENT NO.         : 8,640,571 B2
APPLICATION NO.    : 12/847388
DATED              : February 4, 2014
INVENTOR(S)        : Tatsuo Shimizu et al.

It is certified that error appears in the above-identified patent and that said Letters Patent is hereby corrected as shown below:

In the Specification:

In column 5, line 63, please insert --IV-IV-- after "taken along".

In column 5, line 67, please insert --VI-VI-- after "taken along".

In column 7, line 28, please insert --8-- after "tapering action part".

In the Claims:

In column 12, line 10, in claim 4, please delete "on" and insert --so--.

In column 12, line 32, in claim 4, please delete "dually" and insert --gradually--.

In column 12, line 34, in claim 4, please delete "on-parallel" and insert --non-parallel--.

Signed and Sealed this
Twenty-ninth Day of July, 2014

Michelle K. Lee
*Deputy Director of the United States Patent and Trademark Office*